US012720504B2

(12) United States Patent
Xie et al.

(10) Patent No.: US 12,720,504 B2
(45) Date of Patent: Aug. 25, 2026

(54) RESOURCE ALLOCATION METHOD, APPARATUS, AND SYSTEM

(71) Applicant: Huawei Technologies Co., Ltd., Shenzhen (CN)

(72) Inventors: Zichen Xie, Shanghai (CN); Weihua Li, Shanghai (CN); Rong Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 287 days.

(21) Appl. No.: 18/423,996

(22) Filed: Jan. 26, 2024

(65) Prior Publication Data

US 2024/0172189 A1 May 23, 2024

Related U.S. Application Data

(63) Continuation of application No. PCT/CN2021/109924, filed on Jul. 30, 2021.

(51) Int. Cl.
*H04W 72/04* (2023.01)
*H04W 72/20* (2023.01)
*H04W 76/10* (2018.01)

(52) U.S. Cl.
CPC .......... *H04W 72/04* (2013.01); *H04W 72/20* (2023.01); *H04W 76/10* (2018.02)

(58) Field of Classification Search
CPC ..... H04W 72/04; H04W 72/20; H04W 76/10; H04W 84/20; H04W 4/80; Y02D 30/70
See application file for complete search history.

(56) References Cited

U.S. PATENT DOCUMENTS

2019/0173623 A1 6/2019 Khosravirad et al.
2020/0084697 A1* 3/2020 Sridhara ............... H04W 48/10
2020/0221359 A1* 7/2020 Srivastava .......... H04W 36/035
2020/0322788 A1* 10/2020 Batra ...................... H04W 8/24
2020/0329443 A1* 10/2020 Goyal ................. H04W 56/001

FOREIGN PATENT DOCUMENTS

CN 101502057 A 8/2009

* cited by examiner

*Primary Examiner* — Eric Myers
(74) *Attorney, Agent, or Firm* — Conley Rose, P.C.

(57) ABSTRACT

In a resource allocation method, a master control device establishes a first asynchronous connection link with a first slave device. The master control device establishes a first synchronous connection link with the first slave device based on the first asynchronous connection link. The master control device dynamically allocates a first air interface resource to the first asynchronous connection link based on indication information in a data packet transmitted on the first synchronous connection link. The indication information indicates whether control signaling transmission needs to be performed on the first asynchronous connection link.

17 Claims, 9 Drawing Sheets

Figure 3:
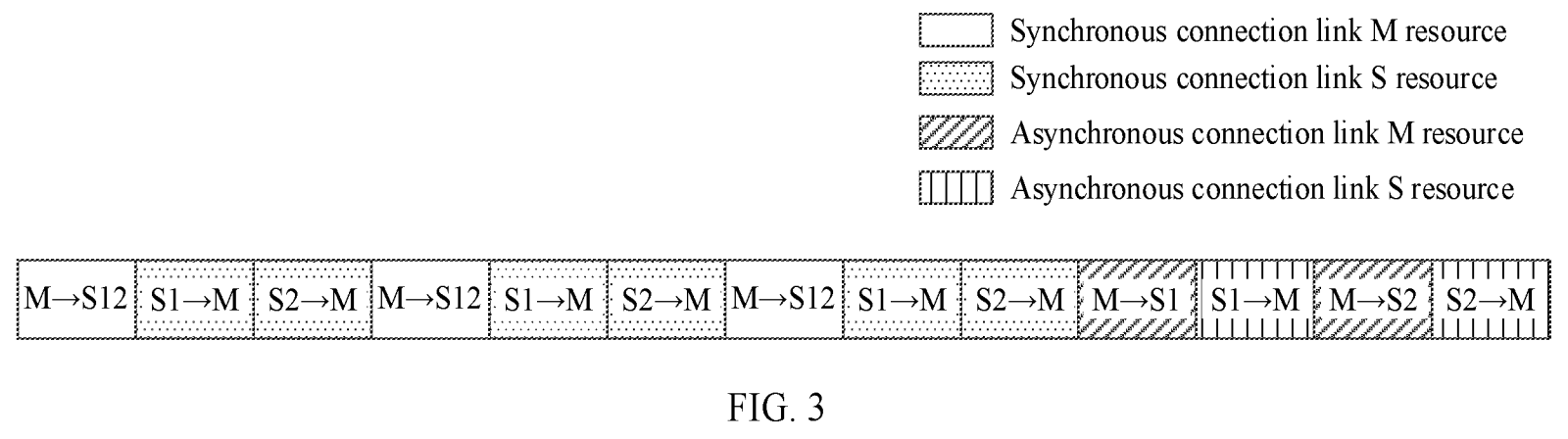

Synchronous connection link M resource
Synchronous connection link S resource
Asynchronous connection link M resource
Asynchronous connection link S resource

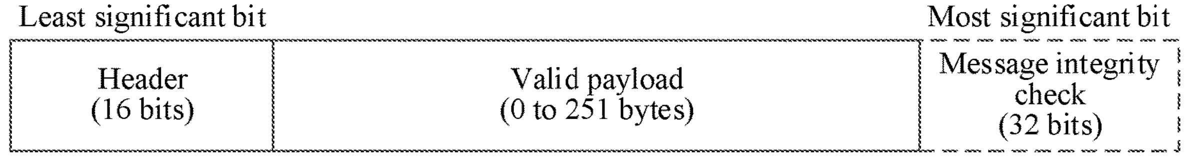
FIG. 4
FIG. 5
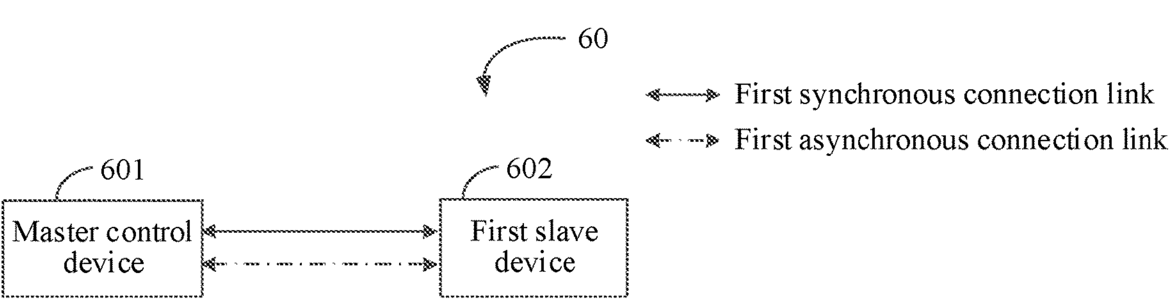
FIG. 6
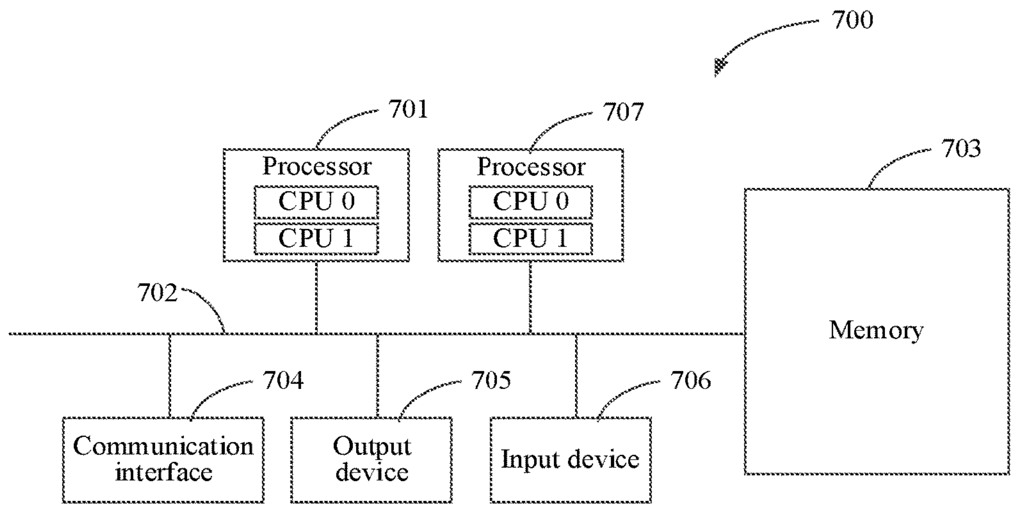
FIG. 7

RESOURCE ALLOCATION METHOD, APPARATUS, AND SYSTEM

CROSS-REFERENCE TO RELATED APPLICATIONS

This application is a continuation of International Patent Application No. PCT/CN2021/109924 filed on Jul. 30, 2021, the disclosure of which is hereby incorporated by reference in its entirety.

TECHNICAL FIELD

The present disclosure relates to the communication field, and in particular, to a resource allocation method, an apparatus, and a system.

BACKGROUND

Compared with a conventional Bluetooth® technology, a Bluetooth Low Energy (BLE) technology has significant advantages of low power consumption and low costs. Therefore, the BLE technology may be used to transmit a small amount of data between ultra-low power consumption devices.

Currently, when the BLE technology is used to transmit a service between devices, an asynchronous connection link and a synchronous connection link need to be established between a master control device and each slave device. The asynchronous connection link is used to transmit control signaling, and the synchronous connection link is used to transmit real-time data.

In the conventional technology, after the asynchronous connection link and the synchronous connection link are established, the master control device periodically allocates, to the asynchronous connection link, an asynchronous connection link resource used to transmit control signaling, and allocates, to the synchronous connection link, a synchronous connection link resource used to transmit real-time data. However, because there is a small quantity of control signaling, a use frequency of the asynchronous connection link resource used to transmit the control signaling is low, resulting in waste of air interface resources. For example, the BLE technology is applied to a dual-ear true wireless stereo (TWS) headset to transmit audio. The synchronous connection link is used to transmit audio data, and the asynchronous connection link is used to transmit control signaling. In most cases, no signaling is transmitted on the asynchronous connection link. The asynchronous connection link needs to be used to transmit control signaling only, for example, when operations such as volume adjustment, power synchronization, and noise reduction enabling need to be performed on the headset. In the foregoing case, a large waste of air interface resources exists.

SUMMARY

Embodiments of the present disclosure provide a resource allocation method, an apparatus, and a system, to resolve a problem of resource waste in an existing resource allocation method after an asynchronous connection link and a synchronous connection link are established.

To achieve the foregoing objectives, the following technical solutions are used in embodiments of the present disclosure.

According to a first aspect, a resource allocation method is provided. An apparatus for performing the resource allocation method may be a master control device, or may be a module used in a master control device, for example, a chip or a chip system. The following uses an example in which an execution body is the master control device for description. The master control device establishes a first asynchronous connection link with a first slave device; the master control device establishes a first synchronous connection link with the first slave device based on the first asynchronous connection link; and the master control device dynamically allocates a first air interface resource to the first asynchronous connection link based on indication information in a data packet transmitted on the first synchronous connection link, where the indication information indicates whether control signaling transmission needs to be performed on the first asynchronous connection link. In the resource allocation method provided in the present disclosure, the indication information indicates whether the control signaling transmission needs to be performed on the first asynchronous connection link, and the master control device dynamically allocates the first air interface resource to the first asynchronous connection link based on the indication information. Compared with the conventional technology in which the first air interface resource is fixedly allocated to the first asynchronous connection link in each periodicity, the resource allocation method provided in the present disclosure can dynamically allocate the first air interface resource based on the indication information.

With reference to the first aspect, in a possible implementation, the indication information includes first indication information and/or second indication information, the first indication information indicates whether the master control device needs to send control signaling to the first slave device through the first asynchronous connection link, and the second indication information indicates whether the first slave device needs to send control signaling to the master control device through the first asynchronous connection link; and that the master control device dynamically allocates the first air interface resource to the first asynchronous connection link based on the indication information in the data packet transmitted on the first synchronous connection link includes: If at least one of the first indication information or the second indication information indicates that the control signaling transmission needs to be performed on the first asynchronous connection link, the master control device allocates the first air interface resource to the first asynchronous connection link; or if both the first indication information and the second indication information indicate that the control signaling transmission does not need to be performed on the first asynchronous connection link, the master control device allocates, to a link other than the first asynchronous connection link for use, a second air interface resource that is preconfigured in a periodicity in which the indication information is located, where the second air interface resource is used for the master control device to receive or send the control signaling. In the resource allocation method provided in the present disclosure, a resource is allocated to the first asynchronous connection link only when the first asynchronous connection link needs to be used, and when the first asynchronous connection link does not need to be used, a preconfigured resource is used by another link, so that idle resources can be avoided, thereby avoiding a waste of air interface resources.

With reference to the first aspect, in a possible implementation, the master control device receives, through the first synchronous connection link, a second data packet sent by the first slave device, where the second data packet includes the second indication information, and the second indication information indicates whether the first slave device needs to send the control signaling to the master control device through the first asynchronous connection link.

With reference to the first aspect, in a possible implementation, that the master control device dynamically allocates the first air interface resource to the first asynchronous connection link based on the indication information in the data packet transmitted on the first synchronous connection link includes: The master control device allocates the first air interface resource to the first asynchronous connection link in a next periodicity of the periodicity in which the indication information is located. In this solution, the master control device can allocate the first air interface resource to the first asynchronous connection link only in the next periodicity of the periodicity in which the indication information is located. Therefore, this solution is applicable to a scenario in which an amount of data to be transmitted is large, and a duty cycle is high, but a delay requirement is not high, for example, an audio scenario such as high-definition music or calling.

With reference to the first aspect, in a possible implementation, the first air interface resource is a part or all of the second air interface resource that is preconfigured by the master control device in the periodicity in which the indication information is located, and the second air interface resource is used for the master control device to receive or send the control signaling. In this solution, because the master control device can allocate the first air interface resource to the first asynchronous connection link in the periodicity in which the indication information is located, this solution is applicable to a low delay scenario, for example, a scenario of a mouse, a keyboard, game music, or the like.

With reference to the first aspect, in a possible implementation, that the master control device dynamically allocates the first air interface resource to the first asynchronous connection link based on the indication information in the data packet transmitted on the first synchronous connection link includes: The master control device allocates the first air interface resource to the first asynchronous connection link based on a priority of the first slave device and priorities of one or more second slave devices, where the second slave device is a device for transmitting a fourth data packet, the fourth data packet includes fourth indication information, the fourth indication information indicates that control signaling needs to be transmitted on a second asynchronous connection link, and the second asynchronous connection link is used to transmit control signaling between the master control device and the second slave device. In this solution, a preconfigured asynchronous connection link resource in a current periodicity is contended for based on a priority. Although a small amount of control signaling cannot be transmitted, a technical effect of saving resources can still be achieved.

With reference to the first aspect, in a possible implementation, the master control device maintains the first asynchronous connection link if data is transmitted on the first synchronous connection link in a first time period. In this solution, because the first synchronous connection link is established based on the first asynchronous connection link, a connection of an asynchronous connection link may be maintained based on receiving and sending of packets of a synchronous connection link, and there is no need to transmit a null packet to maintain the asynchronous connection link, thereby reducing power consumption of a system.

According to a second aspect, a resource allocation method is provided. An apparatus for performing the resource allocation method may be a first slave device, or may be a module used in a first slave device, for example, a chip or a chip system. An example in which an execution body is the first slave device is used below for description. The first slave device generates a second data packet, where the second data packet includes second indication information, and the second indication information indicates whether the communication device needs to send control signaling to a master control device through a first asynchronous connection link; and the first slave device sends the second data packet to the master control device through a first synchronous connection link, where the first synchronous connection link is used to transmit data between the master control device and the first slave device, and the first asynchronous connection link is used to transmit the control signaling between the master control device and the first slave device.

According to a third aspect, a communication device is provided to implement the foregoing method. The communication device includes a corresponding module, unit, or means for implementing the foregoing method. The module, unit, or means may be implemented by using hardware or software, or implemented by hardware executing corresponding software. The hardware or the software includes one or more modules or units corresponding to the foregoing functions.

With reference to the third aspect, in a possible implementation, the communication device is a Bluetooth chip or a master control device, and the communication device includes: a transceiver and a processor. The transceiver is configured to establish a first asynchronous connection link with a first slave device; the transceiver is further configured to establish a first synchronous connection link with the first slave device based on the first asynchronous connection link; and the processor is configured to dynamically allocate a first air interface resource to the first asynchronous connection link based on indication information in a data packet transmitted on the first synchronous connection link, where the indication information indicates whether control signaling transmission needs to be performed on the first asynchronous connection link.

With reference to the third aspect, in a possible implementation, the indication information includes first indication information and/or second indication information, the first indication information indicates whether the communication device needs to send control signaling to the first slave device through the first asynchronous connection link, and the second indication information indicates whether the first slave device needs to send control signaling to the communication device through the first asynchronous connection link; and that the processor is configured to dynamically allocate the first air interface resource to the first asynchronous connection link based on the indication information in the data packet transmitted on the first synchronous connection link includes: The processor is configured to: if at least one of the first indication information or the second indication information indicates that the control signaling transmission needs to be performed on the first asynchronous connection link, allocate the first air interface resource to the first asynchronous connection link; or if both the first indication information and the second indication information indicate that the control signaling transmission does not need to be performed on the first asynchronous connection link, allocate, to a link other than the first asynchronous connection link for use, a second air interface resource that is preconfigured in a periodicity in which the indication information is located, where the second air interface resource is used for the communication device to receive or send the control signaling.

With reference to the third aspect, in a possible implementation, the first indication information includes third indication information, and the third indication information indicates that the communication device needs to send the control signaling to the first slave device through the first asynchronous connection link; the processor is further configured to generate the control signaling in response to a control operation of a user, where the control instruction is used to control data transmission on the first synchronous connection link; the processor is further configured to generate a first data packet, where the first data packet includes the third indication information; and the transceiver is further configured to send the first data packet to the first slave device through the first synchronous connection link.

With reference to the third aspect, in a possible implementation, the transceiver is further configured to: receive, through the first synchronous connection link, a second data packet sent by the first slave device, where the second data packet includes the second indication information, and the second indication information indicates whether the first slave device needs to send the control signaling to the communication device through the first asynchronous connection link.

With reference to the third aspect, in a possible implementation, that the processor is configured to dynamically allocate the first air interface resource to the first asynchronous connection link based on the indication information in the data packet transmitted on the first synchronous connection link includes: The processor is configured to allocate the first air interface resource to the first asynchronous connection link in a next periodicity of the periodicity in which the indication information is located.

With reference to the third aspect, in a possible implementation, the first air interface resource is a part or all of the second air interface resource that is preconfigured by the communication device in the periodicity in which the indication information is located, and the second air interface resource is used for the communication device to receive or send the control signaling.

With reference to the third aspect, in a possible implementation, that the processor is configured to dynamically allocate the first air interface resource to the first asynchronous connection link based on the indication information in the data packet transmitted on the first synchronous connection link includes: The processor is configured to allocate the first air interface resource to the first asynchronous connection link based on a priority of the first slave device and priorities of one or more second slave devices, where the second slave device is a device for transmitting a fourth data packet, the fourth data packet includes fourth indication information, the fourth indication information indicates that control signaling needs to be transmitted on a second asynchronous connection link, and the second asynchronous connection link is used to transmit control signaling between the communication device and the second slave device.

With reference to the third aspect, in a possible implementation, the processor is further configured to: maintain the first asynchronous connection link if data is transmitted on the first synchronous connection link in a first time period.

According to a fourth aspect, a communication device is provided to implement the foregoing method. The communication device includes a corresponding module, unit, or means for implementing the foregoing method. The module, unit, or means may be implemented by using hardware or software, or implemented by hardware executing corresponding software. The hardware or the software includes one or more modules or units corresponding to the foregoing functions.

With reference to the fourth aspect, in a possible implementation, the communication device is a Bluetooth chip or a first slave device, and the communication device includes: a transceiver and a processor. The processor is configured to generate a second data packet, where the second data packet includes second indication information, and the second indication information indicates whether the communication device needs to send control signaling to a master control device through a first asynchronous connection link; and the transceiver is configured to send the second data packet to the master control device through a first synchronous connection link, where the first synchronous connection link is used to transmit data between the master control device and the communication device, and the first asynchronous connection link is used to transmit the control signaling between the master control device and the communication device.

According to a fifth aspect, a communication system is provided, including the communication device according to the second aspect and one or more communication devices according to the third aspect.

According to a sixth aspect, a communication device is provided, including: a processor. The processor is configured to: after being coupled to a memory and reading computer instructions stored in the memory, perform, based on the instructions, the method according to the first aspect.

With reference to the sixth aspect, in a possible implementation, the communication device further includes the memory. The memory is configured to store the computer instructions.

With reference to the sixth aspect, in a possible implementation, the communication device further includes a communication interface. The communication interface is used by the communication device to communicate with another device. For example, the communication interface may be a transceiver, an input/output interface, an interface circuit, an output circuit, an input circuit, a pin, or a related circuit.

With reference to the sixth aspect, in a possible implementation, the communication device may be a chip or a chip system. When the communication device is the chip system, the communication device may include a chip, or may include a chip and another discrete device.

According to a seventh aspect, a computer-readable storage medium is provided. The computer-readable storage medium stores instructions. When the instructions are run on a computer, the computer is enabled to perform the method according to the first aspect.

According to an eighth aspect, a computer program product including instructions is provided. When the computer program product is run on a computer, the computer is enabled to perform the method according to the first aspect.

For technical effects brought by any possible implementation of the second aspect to the eighth aspect, refer to the technical effects brought by the first aspect or different implementations of the first aspect.

BRIEF DESCRIPTION OF DRAWINGS

FIG. 3 is a schematic diagram of a synchronous connection link resource and an asynchronous connection link resource that are allocated by a master control device in the conventional technology;

FIG. 4 is a schematic diagram of a format of a data packet on a link layer in a BLE protocol in the conventional technology;

FIG. 5 is a schematic diagram of a format of a PDU in the conventional technology;

FIG. 6 is a schematic diagram of an architecture of a communication system according to an embodiment of the present disclosure;

FIG. 7 is a schematic diagram 1 of a structure of a communication apparatus according to an embodiment of the present disclosure;

DESCRIPTION OF EMBODIMENTS

For ease of understanding technical solutions in embodiments of the present disclosure, the following first briefly describes technologies or terms related to the present disclosure.

Figure 1:
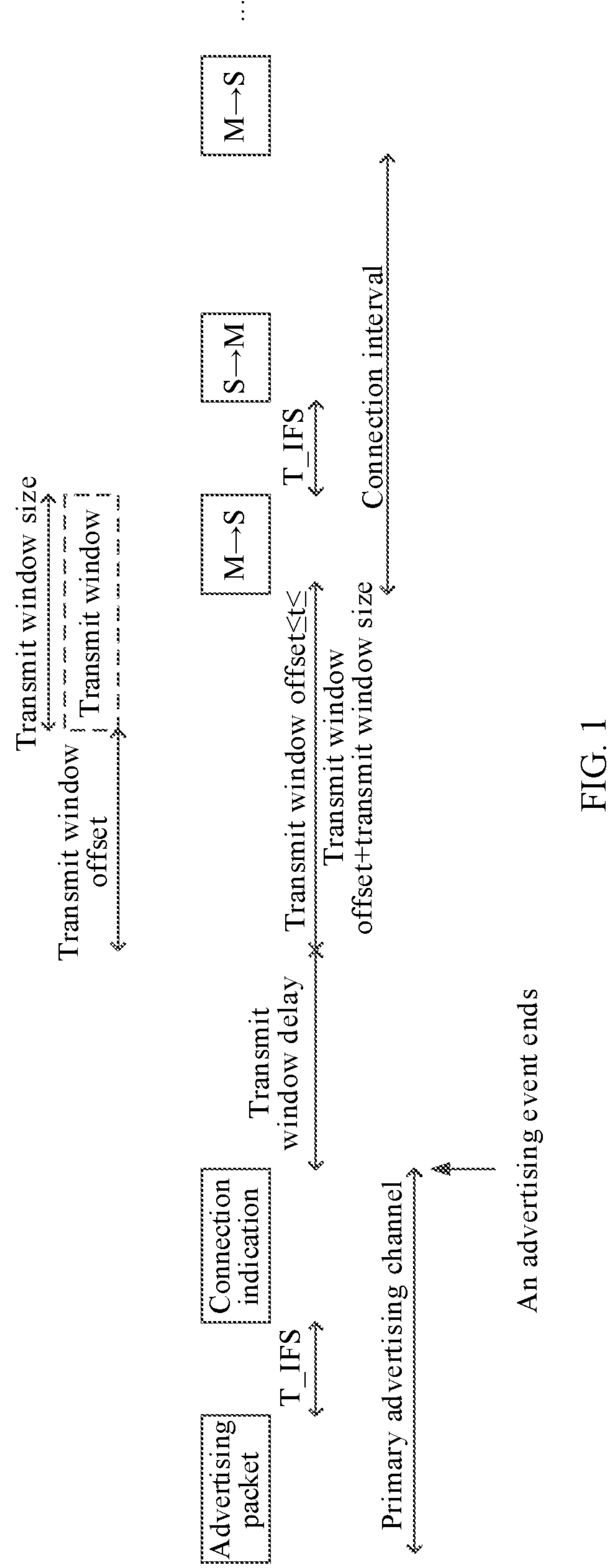
FIG. 1 is a schematic flowchart of establishing an asynchronous connection link in the conventional technology.

An asynchronous connection link (ACL) establishment process:

A BLE protocol is used as an example, and FIG. 1 shows a process of establishing an asynchronous connection link. S (slave) indicates a slave device and is an advertisement sender. M (master) indicates a master control device and is an advertisement receiver. With reference to FIG. 1, the following describes a process from advertising access to establishment of an asynchronous connection link from a perspective of an advertisement receiver. It should be noted that there is an advertising scanning process before the advertising access process, and the advertising scanning process is not shown in FIG. 1.

First, the advertisement receiver receives an advertising packet on a primary advertising channel (primary adv.channel), and after a time interframe space (time_interFrameSpace, T_IFS), feeds back a connection indication (connect_ind) to an advertisement sender on the primary advertising channel. In this case, an advertisement event ends.

Then, after a transmit window delay (transmitWindowDelay) and a time t, the advertisement receiver sends a data packet to the advertisement sender within a transmit window. A time difference between an end moment of the transmit window delay and a start moment of the transmit window is a transmit window offset (transmitWindowOffset), t has a specific value range, a minimum value oft is equal to the transmit window offset, and a maximum value oft is equal to a sum of the transmit window offset and a transmit window size (transmitWindowSize).

Then, after the T_IFS, the advertisement sender sends a data packet to the advertisement receiver.

Finally, the advertisement receiver sends a data packet to the advertisement sender again. Similarly, the advertisement sender sends a data packet to the advertisement receiver again, which is not shown in FIG. 1. After the advertisement receiver and the advertisement sender exchange data for a total of six periodicities, an asynchronous connection link is established. As described above, FIG. 1 does not completely show a second data exchange periodicity, and does not show a third data exchange periodicity to a sixth data exchange periodicity, and a length of each periodicity is a connection interval (connInterval).

Figure 2:
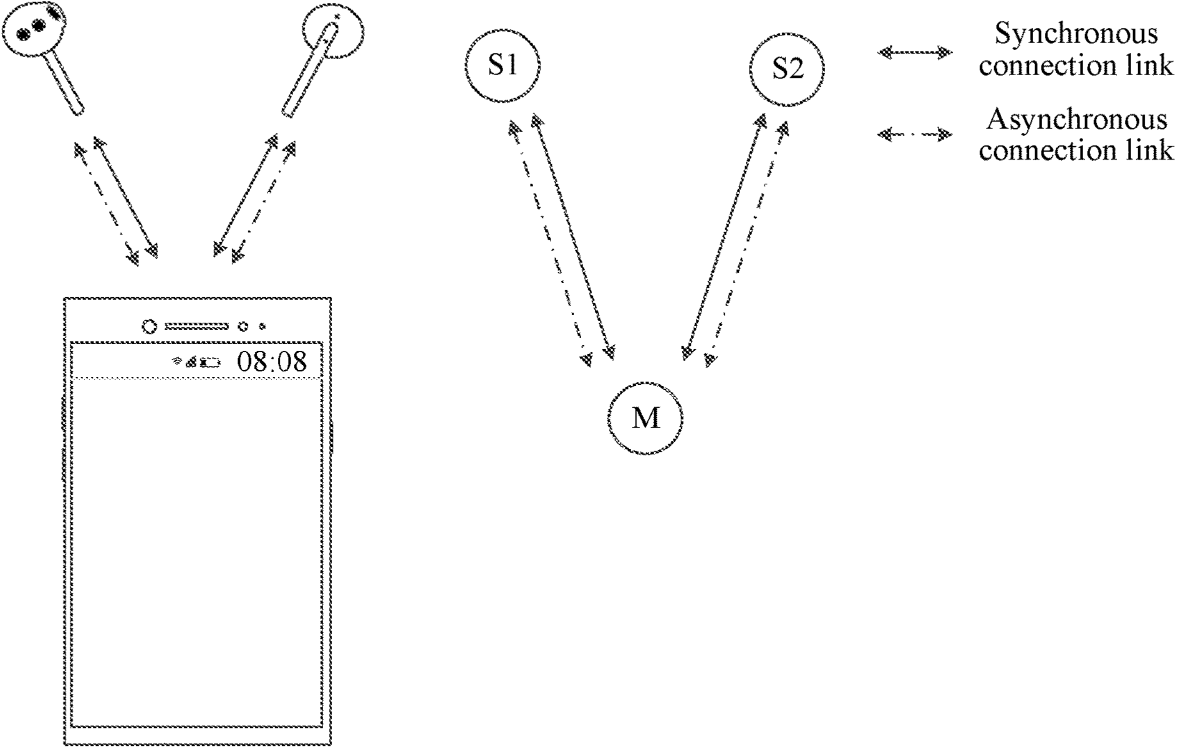
FIG. 2 is a schematic diagram of an architecture of a system for performing service transmission by using a BLE technology in the conventional technology.

An existing resource allocation solution:

Two slave devices are used as an example. FIG. 2 shows a system for performing service transmission by using a BLE technology. S1 and S2 represent two slave devices, and M represents a master control device. For example, S1 may be a left headset of a Bluetooth headset, S2 may be a right headset of the Bluetooth headset, and M may be a mobile phone. An asynchronous connection link is first established and then a synchronous connection link is established between M and S1. An asynchronous connection link is first established and then a synchronous connection link is established between M and S2. Then, M and S1 transmit control signaling on an asynchronous connection link resource through the established asynchronous connection link, and M and S1 transmit data on a synchronous connection link resource through the established synchronous connection link. M and S2 transmit control signaling on an asynchronous connection link resource through the established asynchronous connection link, and M and S2 transmit data on a synchronous connection link resource through the established synchronous connection link.

With reference to the system shown in FIG. 2, FIG. 3 is a schematic diagram of a synchronous connection link resource and an asynchronous connection link resource that are allocated by a master control device in the conventional technology. It should be noted that allocation of the synchronous connection link resource and the asynchronous connection link resource is periodically repeated, and FIG. 3 shows only one periodicity.

In FIG. 3, the synchronous connection link resource includes synchronous connection link resources in directions from M to S1 and S2, from S1 to M, and from S2 to M. "S12" in the figure represents S1 and S2. The synchronous connection link resources in the directions from M to S1 and S2 may be referred to as synchronous connection link M resources, and the synchronous connection link resources in the directions from S1 to M and from S2 to M may be referred to as synchronous connection link S resources. It should be noted that the synchronous connection link resource in FIG. 3 includes three periodicities, each periodicity may be used for data retransmission or new transmission, and a quantity of periodicities included in the synchronous connection link resource is not limited to three. For example, in a low signal-to-noise ratio environment, to ensure communication reliability, the synchronous connection link resource may include more periodicities for data retransmission.

In FIG. 3, the asynchronous connection link resource includes asynchronous connection link resources in directions from M to S1, from S1 to M, from M to S2, and from S2 to M. The asynchronous connection link resources in the directions from M to S1 and from M to S2 may be referred to as asynchronous connection link M resources, and the asynchronous connection link resources in the directions from S1 to M and from S2 to M may be referred to as asynchronous connection link S resources.

The resource allocation solution shown in FIG. 3 has the following disadvantages.

1. Air interface resources are wasted. The master control device fixedly allocates the asynchronous connection link resources in the directions from M to S1, from S1 to M, from M to S2, and from S2 to M in each periodicity. However, control signaling in a service transmission process is small, and a use frequency of an asynchronous connection link resource used to transmit the control signaling is low. Therefore, in most cases, the fixedly allocated asynchronous connection link resources are in an idle state, which causes a waste of air interface resources. Especially, when a quantity of slave devices increases, more asynchronous connection link resources are fixedly allocated by the master control device in each periodicity, and the waste of air interface resources is more obvious.

2. Power consumption of the system increases. When no signaling is transmitted on the asynchronous connection link, a null packet needs to be transmitted at intervals to maintain the asynchronous connection link. Because the null packet is used only to maintain a link and does not carry any useful information, transmission of the null packet increases the power consumption of the system.

Third, a format of a data packet on a link layer in a BLE protocol.

FIG. 4 is a schematic diagram of a format of a data packet on a link layer in a BLE protocol. The data packet on the link layer in the BLE protocol includes a preamble, an access address, a protocol data unit (PDU), and a cyclic redundancy check (CRC) in a sequence from a least significant bit (LSB) to a most significant bit (MSB). The preamble occupies one or two bytes, the access address occupies four bytes, the PDU occupies two to 258 bytes, and the CRC occupies three bytes. Optionally, the data packet on the link layer in the BLE protocol further includes a constant tone extension signal of 16 μs to 160 μs. For a function of each field in the data packet, refer to descriptions in the existing BLE protocol.

With reference to FIG. 4, FIG. 5 is a schematic diagram of a format of a PDU. A PDU includes a header and a valid payload in a sequence from an LSB to an MSB. A length of the header is 16 bits, and the valid payload occupies 0 to 251 bytes. The header may carry a field that functions as an identifier, to avoid a loss of service data. The valid payload is used to carry service data that needs to be transmitted. Optionally, the PDU further includes a message integrity check, and a length of the message integrity check is 32 bits, and the message integrity check is used to ensure that the service data is not tampered with.

The following describes the technical solutions in embodiments of the present disclosure with reference to the accompanying drawings in embodiments of the present disclosure. In the descriptions of the present disclosure, "I" represents an "or" relationship between associated objects unless otherwise specified. For example, A/B may represent A or B. The term "and/or" in the present disclosure indicates only an association relationship for describing associated objects and indicates that three relationships may exist. For example, A and/or B may indicate the following three cases: Only A exists, both A and B exist, and only B exists, where A and B may be singular or plural. In addition, in the descriptions of the present disclosure, "a plurality of" means two or more than two unless otherwise specified. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of the present disclosure, terms such as first and second are used in embodiments of the present disclosure to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of the present disclosure, the word such as "example" or "for example" is used to represent giving an example, an illustration, or a description. Any embodiment or design scheme described as an "example" or "for example" in embodiments of the present disclosure should not be explained as being more preferred or having more advantages than another embodiment or design scheme. Exactly, use of the word such as "example" or "for example" is intended to present a relative concept in a specific manner for ease of understanding.

FIG. 6 is a communication system 60 according to an embodiment of the present disclosure. The communication system 60 includes a master control device 601 and a first slave device 602. A first synchronous connection link used to transmit data and a first asynchronous connection link used to transmit control signaling have been established between the master control device 601 and the first slave device 602.

The master control device 601 is configured to establish the first asynchronous connection link with the first slave device 602; the master control device 601 is further configured to establish the first synchronous connection link with the first slave device 602 based on the first asynchronous connection link; and the master control device 601 is further configured to dynamically allocate a first air interface resource to the first asynchronous connection link based on indication information in a data packet transmitted on the first synchronous connection link, where the indication information indicates whether control signaling transmission needs to be performed on the first asynchronous connection link. A specific implementation and technical effects of the solution are described in detail in subsequent method embodiments, and details are not described herein again.

Optionally, a related function of the master control device or the first slave device in this embodiment of the present disclosure may be implemented by one device, or may be implemented by a plurality of devices together, or may be implemented by one or more functional modules in one device. This is not specifically limited in this embodiment of the present disclosure. It may be understood that the foregoing function may be a network element in a hardware device, may be a software function running on dedicated hardware, a combination of hardware and software, or a virtualization function instantiated on a platform (for example, a cloud platform).

For example, the related function of the master control device or the first slave device in this embodiment of the present disclosure may be implemented by using a communication apparatus 700 in FIG. 7.

FIG. 7 is a schematic diagram of a structure of a communication apparatus 700 according to an embodiment of the present disclosure. The communication apparatus 700 includes one or more processors 701, a communication line 702, and at least one communication interface (an example in which a communication interface 704 and one processor 701 are included is used in FIG. 7 for description). Optionally, the communication apparatus 700 may further include a memory 703.

The processor 701 may be a CPU, a microprocessor, an application-specific integrated circuit (ASIC), or one or more integrated circuits for controlling program execution in the solutions of the present disclosure.

The communication line 702 may include a path used to connect different components.

The communication interface 704 may be a transceiver module configured to communicate with another device or communication network, for example, an Ethernet, a RAN, or a WLAN. For example, the transceiver module may be an apparatus such as a transceiver or a transceiver. Optionally, the communication interface 704 may alternatively be a transceiver circuit located inside the processor 701, and is configured to implement signal input and signal output of the processor.

The memory 703 may be an apparatus having a storage function. For example, the memory may be a read-only memory (ROM) or another type of static storage device capable of storing static information and instructions, may be a random-access memory (RAM) or another type of dynamic storage device capable of storing information and instructions, or may be an electrically erasable programmable ROM (EEPROM), a compact disc ROM (CD-ROM) or other compact disc storage, optical disc storage (including a compressed optical disc, a laser disc, an optical disc, a digital versatile disc, a BLU-RAY® disc, or the like), a magnetic disk storage medium or another magnetic storage device, or any other medium capable of carrying or storing expected program code in a form of an instruction or a data structure and capable of being accessed by a computer. This is not limited thereto. The memory may independently exist and is connected to the processor through the communication line 702. The memory may alternatively be integrated with the processor.

The memory 703 is configured to store computer-executable instructions for executing the solutions of the present disclosure, and the processor 701 controls the execution. The processor 701 is configured to execute the computer-executable instructions stored in the memory 703, to implement the resource allocation method provided in embodiments of the present disclosure.

Alternatively, in this embodiment of the present disclosure, the processor 701 may perform processing-related functions in the resource allocation method provided in the following embodiments of the present disclosure, and the communication interface 704 is responsible for communicating with another device or communication network. This is not specifically limited in this embodiment of the present disclosure.

The computer-executable instructions in embodiments of the present disclosure may also be referred to as application program code. This is not specifically limited in embodiments of the present disclosure.

During specific implementation, in an embodiment, the processor 701 may include one or more CPUs, for example, a CPU 0 and a CPU 1 in FIG. 7.

During specific implementation, in an embodiment, the communication apparatus 700 may include a plurality of processors, for example, the processor 701 and a processor 707 shown in FIG. 7. Each of the processors may be a single-core (single-CPU) processor, or may be a multi-core (multi-CPU) processor. The processor herein may be one or more devices, circuits, and/or processing cores configured to process data (for example, computer program instructions).

In a specific implementation, in an embodiment, the communication apparatus 700 may further include an output device 705 and an input device 706. The output device 705 communicates with the processor 701, and may display information in a plurality of manners.

The communication apparatus 700 may be a general-purpose apparatus or a dedicated apparatus. For example, the communication apparatus 700 may be a desktop computer, a portable computer, a network server, a palmtop computer, a personal digital assistant (PDA), a mobile phone, a tablet computer, a wireless terminal apparatus, an in-vehicle terminal apparatus, an embedded device, or a device having a structure similar to that in FIG. 7. A type of the communication apparatus 700 is not limited in embodiments of the present disclosure.

The following specifically describes the resource allocation method provided in embodiments of the present disclosure with reference to FIG. 1 to FIG. 7.

Figure 8:
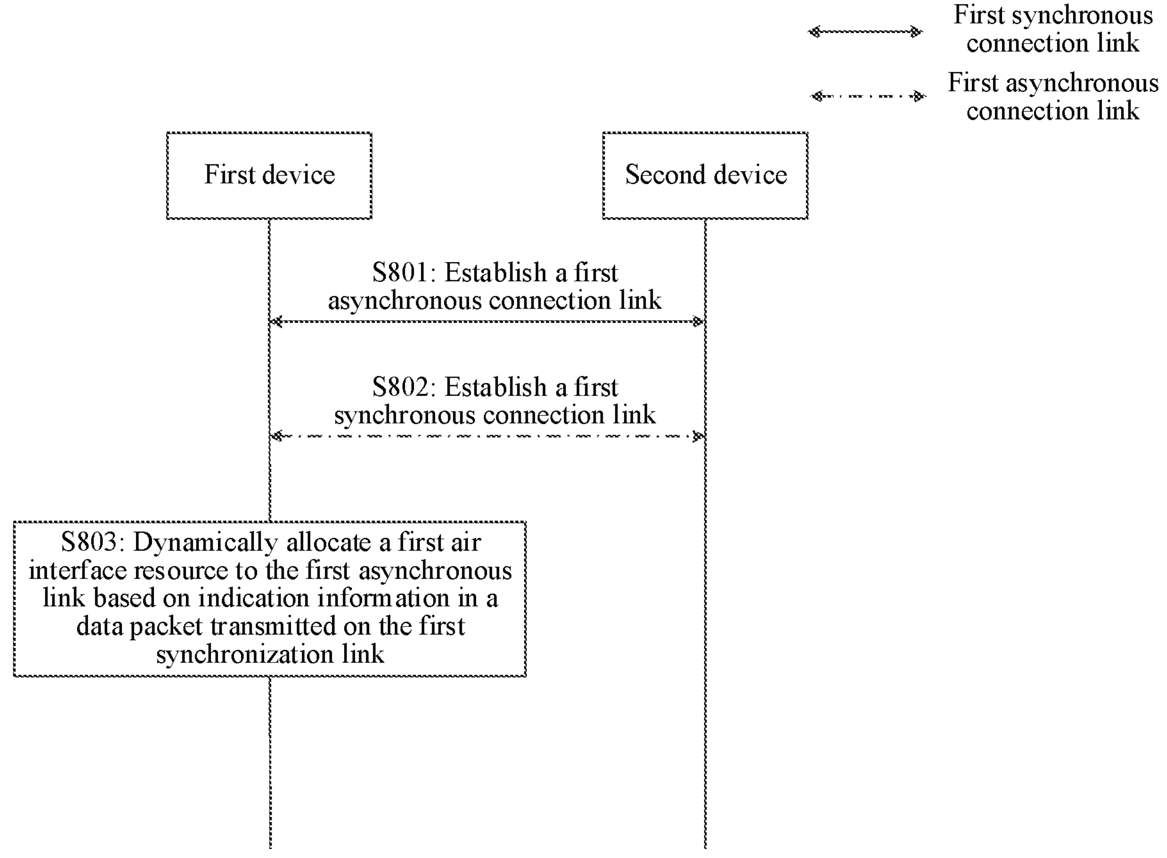
FIG. 8 is a flowchart of a resource allocation method according to an embodiment of the present disclosure.

FIG. 8 shows a resource allocation method according to an embodiment of the present disclosure. The resource allocation method includes the following steps.

S801: A master control device establishes a first asynchronous connection link with a first slave device.

In this embodiment of the present disclosure, the first asynchronous connection link is used to transmit control signaling between the master control device and the first slave device.

For example, the master control device may be the mobile phone M in FIG. 2, and the first slave device is the left headset S1 or the right headset S2 in FIG. 2.

S802: The master control device establishes a first synchronous connection link with the first slave device based on the first asynchronous connection link.

In this embodiment of the present disclosure, the first synchronous connection link is used to transmit data between the master control device and the first slave device.

S803: The master control device dynamically allocates a first air interface resource to the first asynchronous connection link based on indication information in a data packet transmitted on the first synchronous connection link, where the indication information indicates whether control signaling transmission needs to be performed on the first asynchronous connection link.

Optionally, the indication information may be represented by using one bit. For example, a bit value "1" indicates that the control signaling transmission needs to be performed on the first asynchronous connection link, and a bit value "0" indicates that the control signaling transmission does not need to be performed on the first asynchronous connection link. Alternatively, for example, a bit value "0" indicates that the control signaling transmission needs to be performed on the first asynchronous connection link, and a bit value "1" indicates that the control signaling transmission does not need to be performed on the first asynchronous connection link. This is not limited in this embodiment of the present disclosure.

Optionally, the indication information may be carried in a header of the data packet. For example, the indication information may be carried in a header field of the PDU in the BLE protocol shown in FIG. 5. For example, the indication information may be an ACL stop flag (ASF) field.

For example, if the first slave device is S1 in FIG. 2, that is, the first asynchronous connection link is the asynchronous connection link between M and S1 in FIG. 2, the first air interface resource is the asynchronous connection link resources in the directions from M to S1 and from S1 to M in FIG. 3. If the first slave device is S2 in FIG. 2, that is, the first asynchronous connection link is the asynchronous connection link between M and S2 in FIG. 2, the first air interface resource is the asynchronous connection link resources in the directions from M to S2 and from S2 to M in FIG. 3.

Optionally, the indication information includes first indication information and/or second indication information, the first indication information indicates whether the master control device needs to send control signaling to the first slave device through the first asynchronous connection link, and the second indication information indicates whether the first slave device needs to send control signaling to the master control device through the first asynchronous connection link; and that the master control device dynamically allocates the first air interface resource to the first asynchronous connection link based on the indication information in the data packet transmitted on the first synchronous connection link includes: If at least one of the first indication information or the second indication information indicates that the control signaling transmission needs to be performed on the first asynchronous connection link, the master control device allocates the first air interface resource to the first asynchronous connection link; or if both the first indication information and the second indication information indicate that the control signaling transmission does not need to be performed on the first asynchronous connection link, the master control device allocates, to a link other than the first asynchronous connection link for use, a second air interface resource that is preconfigured in a periodicity in which the indication information is located, where the second air interface resource is used for the master control device to receive or send the control signaling. In the resource allocation method provided in the present disclosure, a resource is allocated to the first asynchronous connection link only when the first asynchronous connection link needs to be used, and when the first asynchronous connection link does not need to be used, a preconfigured resource is used by another link, so that idle resources can be avoided, thereby avoiding a waste of air interface resources.

Figure 9:
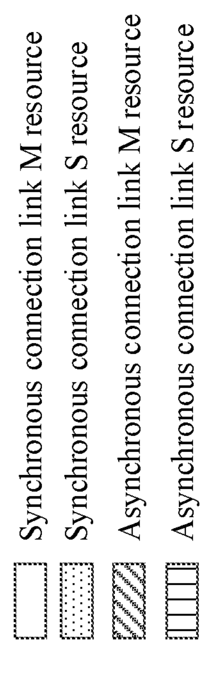
FIG. 9 is a schematic diagram of a difference between a resource allocation method according to the present disclosure and an existing resource allocation method.
Figure 9:
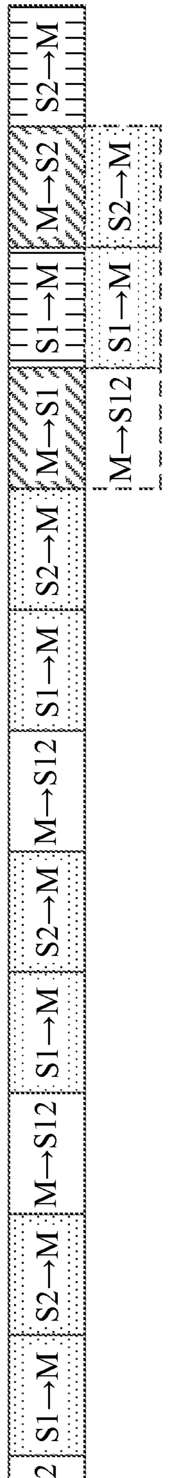

With reference to FIG. 3, FIG. 9 shows a difference between an existing resource allocation solution and a resource allocation solution provided in the present disclosure. A solid-line box represents the existing resource allocation solution, and the second air interface resource may be an asynchronous connection link M resource and an asynchronous connection link S resource that are fixedly preconfigured in this periodicity. If both the first indication information and the second indication information indicate that the control signaling transmission does not need to be performed on the first asynchronous connection link, the master control device allocates the second air interface resource to, for example, the first synchronous connection link for use. That is, as shown by a dashed-line box in FIG. 9, the idle second air interface resource is used as synchronous connection link resources in directions from M to S1 and S2, from S1 to M, and from S2 to M.

Optionally, the first indication information includes third indication information, and the third indication information indicates that the master control device needs to send the control signaling to the first slave device through the first asynchronous connection link. The method further includes: The master control device generates the control signaling in response to a control operation of a user, where the control instruction is used to control data transmission on the first synchronous connection link; the master control device generates a first data packet, where the first data packet includes the third indication information; and the master control device sends the first data packet to the first slave device through the first synchronous connection link.

In this embodiment of the present disclosure, a value of the indication information is 0 by default. If the master control device needs to send the control signaling to the first slave device through the first asynchronous connection link, for example, when a volume adjustment button, a power synchronization button, a noise reduction enabling button, or the like is clicked on a side of the master control device, correspondingly, a value of the first indication information is set to 1, that is, the third indication information.

For example, a resource occupied for sending the first data packet to the first slave device by the master control device through the first synchronous connection link is the synchronous connection link resources in the directions from M to S1 and S2 in FIG. 3.

If the first slave device is S1 in FIG. 2, that is, the first asynchronous connection link is the asynchronous connection link between M and S1 in FIG. 2, and if the first slave device is S2 in FIG. 2, that is, the first asynchronous connection link is the asynchronous connection link between M and S2 in FIG. 2, a resource occupied for sending the first data packet to the first slave device by the master control device through the first synchronous connection link is the synchronous connection link resource in the direction from M to S2 in FIG. 3.

Optionally, the master control device receives, through the first synchronous connection link, a second data packet sent by the first slave device, where the second data packet includes the second indication information, and the second indication information indicates whether the first slave device needs to send the control signaling to the master control device through the first asynchronous connection link. In other words, in this embodiment of the present disclosure, the master control device may send the first data packet including the first indication information to the first slave device, or the master control device may receive the second data packet including the second indication information from the first slave device. Both the first indication information and the second indication information indicate whether the control signaling needs to be transmitted on the first asynchronous connection link. This is not limited in the present disclosure.

For example, if the first slave device is S1 in FIG. 2, that is, the first asynchronous connection link is the asynchronous connection link between M and S1 in FIG. 2, a resource occupied for receiving, by the master control device through the first synchronous connection link, the second data packet sent by the first slave device is the synchronous connection link resource in the direction from S1 to M in FIG. 3. If the first slave device is S2 in FIG. 2, that is, the first asynchronous connection link is the asynchronous connection link between M and S1 in FIG. 2, a resource occupied for receiving, by the master control device through the first synchronous connection link, the second data packet sent by the first slave device is the synchronous connection link resource in the direction from S2 to M in FIG. 3.

In the resource allocation method provided in the present disclosure, the indication information indicates whether the control signaling transmission needs to be performed on the first asynchronous connection link, and the master control device dynamically allocates the first air interface resource to the first asynchronous connection link based on the indication information. Compared with the conventional technology in which the first air interface resource is fixedly allocated to the first asynchronous connection link in each periodicity, the resource allocation method provided in the present disclosure can dynamically allocate the first air interface resource based on the indication information. In a possible implementation, that the master control device dynamically allocates the first air interface resource to the first asynchronous connection link based on the indication information in the data packet transmitted on the first synchronous connection link includes: The master control device allocates the first air interface resource to the first asynchronous connection link in a next periodicity of the periodicity in which the indication information is located. In this solution, the master control device can allocate the first air interface resource to the first asynchronous connection link only in the next periodicity of the periodicity in which the indication information is located. Therefore, this solution is applicable to a scenario in which an amount of data to be transmitted is large, and a duty cycle is high, but a delay requirement is not high, for example, an audio scenario such as high-definition music or calling.

Figure 10:
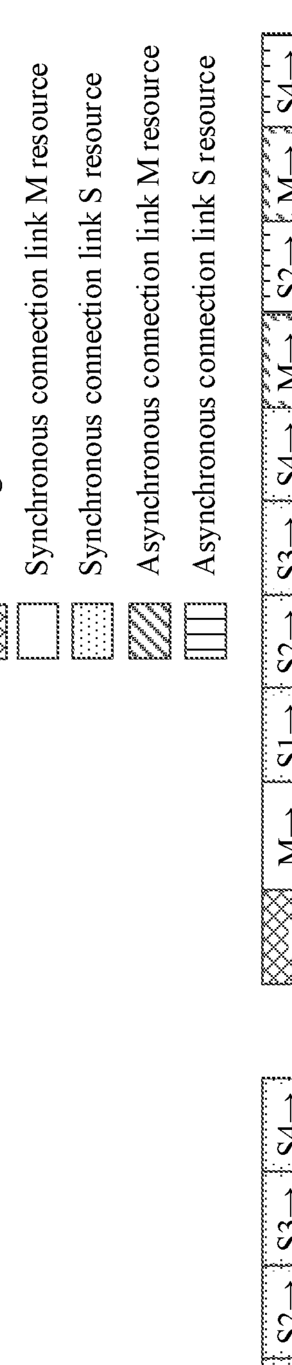
FIG. 10 is a flowchart of Example 1 of a resource allocation method according to an embodiment of the present disclosure.

For example, there are four slave devices in a system, the first indication information and the second indication information are ASF fields, the ASF field is represented by using one bit, a bit value "1" indicates that the control signaling needs to be transmitted on the first asynchronous connection link, and a bit value "0" indicates that the control signaling does not need to be transmitted on the first asynchronous connection link. FIG. 10 shows an example of a resource allocation method according to an embodiment of the present disclosure. It should be noted that, for simplification of description, different from that the synchronous connection link resource shown in FIG. 3 includes three periodicities, FIG. 10 shows only a case that a synchronous connection link resource includes one periodicity.

In FIG. 10, a synchronous resource and an asynchronous resource are allocated in a unit of a control (C) frame. Generally, lengths of control frames are the same, unless the length of the control frame is artificially changed. However, after the change, lengths of all control frames still remain the same. For example, a current length of each control frame is 10 ms. After the length of each control frame is artificially changed to 12 ms, the length of each control frame is changed to 12 ms. In the figure, C indicates starting of a current C frame.

For example, a value of an ASF in each data packet transmitted on a synchronous connection link is 0 by default. When control signaling needs to be exchanged between M and S, for example, when a volume adjustment button, a power synchronization button, a noise reduction enabling button, or the like is clicked on a side of a slave device S2, correspondingly, a value of an ASF in a data packet transmitted on a synchronous connection link resource in a direction from S2 to M is set to 1, indicating that control signaling needs to be transmitted on an asynchronous connection link between S2 and M.

As shown in FIG. 10, when a value of an ASF carried in a data packet sent by S2 to M on a synchronous resource is 1, M allocates asynchronous connection link resources in directions from M to S2 and from S2 to M, on a next C frame of the current C frame. When a value of an ASF carried in a data packet sent by S4 to M on a synchronous resource is 1, M allocates asynchronous connection link resources in directions from M to S4 and from S4 to M on the next C frame of the current C frame. On a synchronous resource of a first C frame in the figure, both values of ASFs carried in data packets exchanged between S1 and M and between S3 and M are 0. Therefore, on a next C frame of the first C frame, no asynchronous connection link resource used for S1 and S3 to send and receive control signaling is allocated.

In the example shown in FIG. 10, if values of ASFs in all data packets on the synchronous resource of the first C frame are the default value 0, no asynchronous connection link resource is allocated on the next C frame of the first C frame.

In another possible implementation, the first air interface resource is a part or all of the second air interface resource that is preconfigured by the master control device in the periodicity in which the indication information is located, and the second air interface resource is used for the master control device to receive or send the control signaling. In this solution, because the master control device can allocate the first air interface resource to the first asynchronous connection link in the periodicity in which the indication information is located, this solution is applicable to a low delay scenario, for example, a scenario of a mouse, a keyboard, game music, or the like.

Optionally, that the master control device dynamically allocates the first air interface resource to the first asynchronous connection link based on the indication information in the data packet transmitted on the first synchronous connection link includes: The master control device allocates the first air interface resource to the first asynchronous connection link based on a priority of the first slave device and priorities of one or more second slave devices, where the second slave device is a device for transmitting a fourth data packet, the fourth data packet includes fourth indication information, the fourth indication information indicates that control signaling needs to be transmitted on a second asynchronous connection link, and the second asynchronous connection link is used to transmit control signaling between the master control device and the second slave device. In this solution, a preconfigured asynchronous connection link resource in a current periodicity is contended for based on a priority. Although a small amount of control signaling cannot be transmitted, a technical effect of saving resources can still be achieved.

For example, the second slave device may be a slave device that receives or sends a data packet in which a value of an ASF is 1 on the synchronous connection link resource and that is other than the first slave device.

In this implementation, the master control device preconfigures a second air interface resource. For example, the second air interface resource is K asynchronous connection link resources in directions from M to the slave devices S and K asynchronous connection link resources in directions from the slave devices S to the M, where a value of K is less than a quantity of slave devices in the system. It is assumed that J Ss receive or send data packets in which values of ASFs are 1 on synchronous connection link resources. If J≤K, M allocates, to each of the J Ss, an asynchronous connection link resource used to transmit control signaling. If J>K, M first performs priority ranking on services transmitted by the J Ss, then selects K Ss with higher priorities from the J Ss, and allocates, to each of the selected K Ss, an asynchronous connection link resource used to transmit control signaling. For example, the priority of the service may be reflected by using an importance degree and/or an emergency degree of the service.

Figure 11:
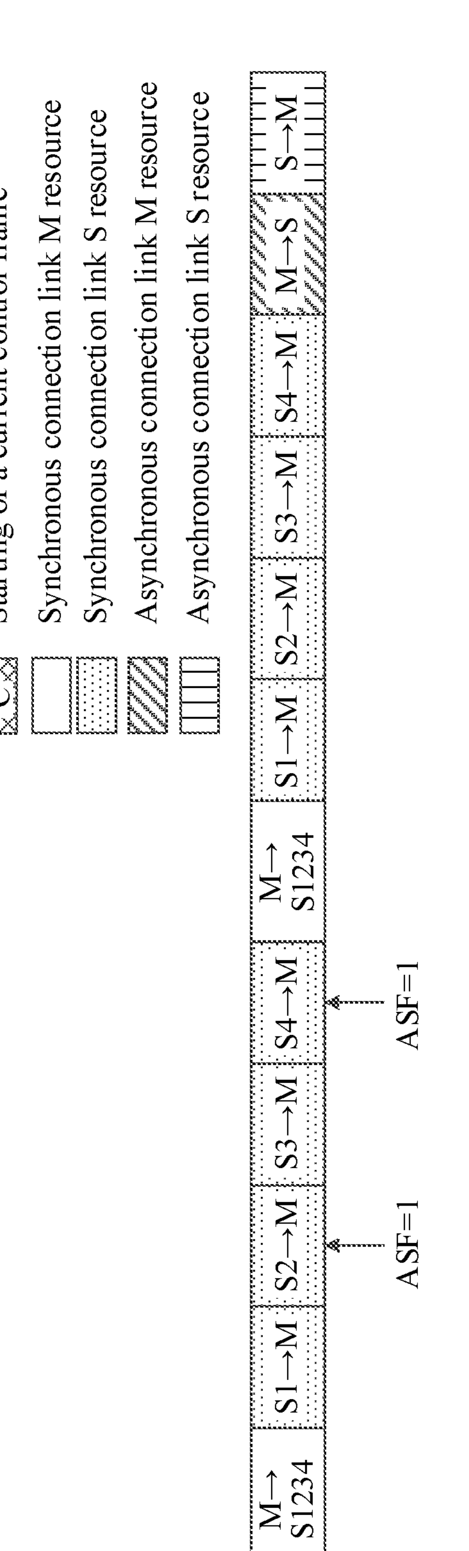
FIG. 11 is a flowchart of Example 2 of a resource allocation method according to an embodiment of the present disclosure.

FIG. 11 shows an example of another resource allocation method according to an embodiment of the present disclosure when a quantity of slave devices in a system is 4, J=2, and K=1. It should be noted that, for simplification of description, different from that the synchronous connection link resource shown in FIG. 3 includes three periodicities, FIG. 11 shows only a case that a synchronous connection link resource includes two periodicities.

As shown in FIG. 11, M preconfigures, in a current C frame, one asynchronous connection link resource in a direction from M to S and one asynchronous connection link resource in a direction from S to M. When a value of an ASF carried in a data packet sent by S2 to M on a synchronous resource is 1, and a value of an ASF carried in a data packet sent by S4 to M on a synchronous resource is 1, M allocates the asynchronous connection link resources preconfigured in the current C frame to one of S2 and S4 with a higher service priority.

In the example shown in FIG. 11, if values of ASFs in all data packets on the synchronous resources of the C frame are a default value 0, the preconfigured asynchronous connection link resources may be allocated to another link for use.

Optionally, the resource allocation method provided in this embodiment of the present disclosure further includes: The master control device maintains the first asynchronous connection link if data is transmitted on the first synchronous connection link in a first time period. In this solution, because the first synchronous connection link is established based on the first asynchronous connection link, a connection of an asynchronous connection link may be maintained based on receiving and sending of packets of a synchronous connection link, and there is no need to transmit a null packet to maintain the asynchronous connection link, thereby reducing power consumption of a system.

Because both the master control device and the first slave device in the foregoing embodiments may use the architecture of the communication apparatus 700 shown in FIG. 7, actions of the master control device in the foregoing embodiments may be executed by the processor 701 in the communication apparatus 700 shown in FIG. 7 invoking the application program code stored in the memory 703, to instruct the master control device to execute the actions, and actions of the first slave device in the foregoing embodiments may be executed by the processor 701 in the communication apparatus 700 shown in FIG. 7 invoking the application program code stored in the memory 703, to instruct the first slave device to execute the actions. This is not limited in this embodiment.

It may be understood that, in the foregoing embodiments, the method and/or the step implemented by the master control device may alternatively be implemented by a component (for example, a chip or a circuit) that may be used in the master control device, and the method and/or the step implemented by the first slave device may alternatively be implemented by a component (for example, a chip or a circuit) that may be used in the first slave device.

The foregoing mainly describes the solutions provided in embodiments of the present disclosure from a perspective of interaction between network elements. Correspondingly, an embodiment of the present disclosure further provides a communication apparatus, and the communication apparatus is configured to implement the foregoing methods. The communication apparatus may be the master control device in the foregoing method embodiment, or an apparatus including the foregoing master control device, or a component that may be used in a master control device; or the communication apparatus may be the first slave device in the foregoing method embodiment, or an apparatus including the foregoing first slave device, or a component that may be used in the first slave device. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In embodiments of the present disclosure, the communication apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in embodiments of the present disclosure, module division is an example, and is merely a logical function division. In actual implementation, another division manner may be used.

Figure 12:
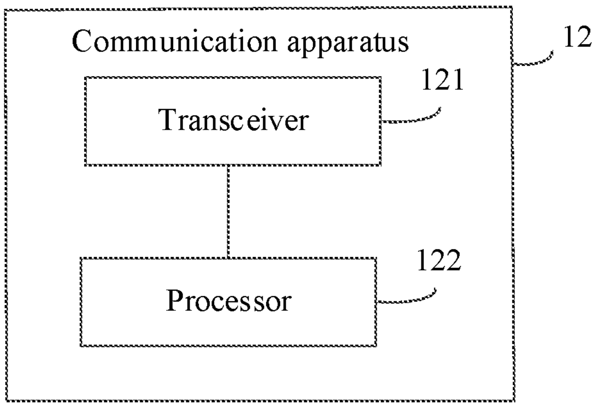
FIG. 12 is a schematic diagram 2 of a structure of a communication apparatus according to an embodiment of the present disclosure.

FIG. 12 is a schematic diagram of a structure of a communication apparatus 12. The communication apparatus 12 includes a transceiver 121 and a processor 122. The transceiver 121 may also be referred to as a transceiver unit configured to implement a transceiver function, for example, may be a transceiver circuit, a transceiver, or a communication interface.

An example in which the communication apparatus 12 is the master control device in the foregoing method embodiment is used.

The transceiver 121 is configured to establish a first asynchronous connection link with a first slave device. The transceiver 121 is further configured to establish a first synchronous connection link with the first slave device based on the first asynchronous connection link. The processor 122 is configured to dynamically allocate a first air interface resource to the first asynchronous connection link based on indication information in a data packet transmitted on the first synchronous connection link, where the indication information indicates whether control signaling transmission needs to be performed on the first asynchronous connection link.

In a possible implementation, the indication information includes first indication information and/or second indication information, the first indication information indicates whether the control device needs to send control signaling to the first slave device through the first asynchronous connection link, and the second indication information indicates whether the first slave device needs to send control signaling to the control device through the first asynchronous connection link; and that the processor 122 is configured to dynamically allocate the first air interface resource to the first asynchronous connection link based on the indication information in the data packet transmitted on the first synchronous connection link includes: The processor is configured to: if at least one of the first indication information or the second indication information indicates that the control signaling transmission needs to be performed on the first asynchronous connection link, allocate the first air interface resource to the first asynchronous connection link; or if both the first indication information and the second indication information indicate that the control signaling transmission does not need to be performed on the first asynchronous connection link, allocate, to a link other than the first asynchronous connection link for use, a second air interface resource that is preconfigured in a periodicity in which the indication information is located, where the second air interface resource is used for the master control device to receive or send the control signaling.

In a possible implementation, the first indication information includes third indication information, and the third indication information indicates that the control device needs to send the control signaling to the first slave device through the first asynchronous connection link; the processor 122 is further configured to generate the control signaling in response to a control operation of a user, where the control instruction is used to control data transmission on the first synchronous connection link; the processor 122 is further configured to generate a first data packet, where the first data packet includes the third indication information; and the transceiver 121 is further configured to send the first data packet to the first slave device through the first synchronous connection link.

In a possible implementation, the transceiver 121 is further configured to: receive, through the first synchronous connection link, a second data packet sent by the first slave device, where the second data packet includes the second indication information, and the second indication information indicates whether the first slave device needs to send the control signaling to the control device through the first asynchronous connection link.

In a possible implementation, that the processor 122 is configured to dynamically allocate the first air interface resource to the first asynchronous connection link based on the indication information in the data packet transmitted on the first synchronous connection link includes: The processor is configured to allocate the first air interface resource to the first asynchronous connection link in a next periodicity of the periodicity in which the indication information is located.

In a possible implementation, that the processor 122 is configured to dynamically allocate the first air interface resource to the first asynchronous connection link based on the indication information in the data packet transmitted on the first synchronous connection link includes: The processor is configured to allocate the first air interface resource to the first asynchronous connection link based on a priority of the first slave device and priorities of one or more second slave devices, where the second slave device is a device for transmitting a fourth data packet, the fourth data packet includes fourth indication information, the fourth indication information indicates that control signaling needs to be transmitted on a second asynchronous connection link, and the second asynchronous connection link is used to transmit control signaling between the control device and the second slave device.

In a possible implementation, the processor 122 is further configured to: maintain the first asynchronous connection link if data is transmitted on the first synchronous connection link in a first time period.

For example, the communication apparatus 12 is the first slave device in the foregoing method embodiment.

The processor 122 is configured to generate a second data packet, where the second data packet includes second indication information, and the second indication information indicates whether the first slave device needs to send control signaling to the master control device through the first asynchronous connection link.

The transceiver 121 is configured to send the second data packet to the master control device through the first synchronous connection link;

The first synchronous connection link is used to transmit data between the master control device and the first slave device, and the first asynchronous connection link is used to transmit control signaling between the master control device and the first slave device.

All related content of the steps in the foregoing method embodiments may be cited in function descriptions of the corresponding functional modules.

In this embodiment, the communication apparatus 12 is presented by integrating the functional modules. The module herein may be an ASIC, a circuit, a processor that executes one or more software or firmware programs, a memory, an integrated logic circuit, and/or another component capable of providing the foregoing functions.

When the communication apparatus 12 is the master control device or the first slave device in the foregoing method embodiment, in a simple embodiment, a person skilled in the art may figure out that the communication apparatus 12 may be in a form of the communication apparatus 700 shown in FIG. 7.

For example, the processor 701 or 707 in the communication apparatus 700 shown in FIG. 7 may invoke the computer-executable instructions stored in the memory 703, to enable the communication apparatus 700 to perform the resource allocation method in the foregoing method embodiment. Specifically, a function/an implementation process of the processor 122 in FIG. 12 may be implemented by the processor 701 or 707 in the communication apparatus 700 shown in FIG. 7 by invoking the computer-executable instructions stored in the memory 703. A function/an implementation process of the transceiver 121 in FIG. 12 may be implemented by using a communication module connected to the communication interface 704 in FIG. 7.

Because the communication apparatus 12 provided in this embodiment may perform the foregoing resource allocation method, for a technical effect that can be achieved by the communication apparatus 12, refer to the foregoing method embodiment.

It should be noted that one or more of the foregoing modules or units may be implemented by software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may be built into a system-on-a-chip (SoC) or an ASIC, or may be an independent semiconductor chip. In addition to cores used to execute software instructions to perform operations or processing, the processor may further include a necessary hardware accelerator, such as a field programmable gate array (FPGA), a programmable logic device (PLD), or a logic circuit implementing a dedicated logical operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of the present disclosure further provides a chip system. The chip system includes at least one processor and an interface. The at least one processor is coupled to a memory through the interface. When the at least one processor executes a computer program or instructions in the memory, the method according to any one of the foregoing method embodiments is performed. In a possible implementation, the communication apparatus further includes a memory. Optionally, the chip system may include a chip, or may include a chip and another discrete component. This is not specifically limited in embodiments of the present disclosure.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Versatile Disc (DVD)), a semiconductor medium (for example, a solid-state drive (SSD)), or the like.

Although the present disclosure is described with reference to embodiments, in a process of implementing the present disclosure that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although the present disclosure is described with reference to specific features and embodiments thereof, it is clear that various modifications and combinations may be made to them without departing from the spirit and scope of the present disclosure. Correspondingly, the specification and accompanying drawings are merely example description of the present disclosure defined by the appended claims, and are considered as any of or all modifications, variations, combinations or equivalents that cover the scope of this application. It is clearly that a person skilled in the art can make various modifications and variations to the present disclosure without departing from the spirit and scope of the present disclosure. This application is intended to cover these modifications and variations of the present disclosure provided that they fall within the scope of protection defined by the following claims and their equivalent technologies.

What is claimed is:

1. A method implemented by a master control device, the method comprising:

establishing a first asynchronous connection link with a first slave device;

establishing a first synchronous connection link with the first slave device based on the first asynchronous connection link;

receiving, through the first synchronous connection link, a data packet comprising indication information indicating whether control signaling transmission needs to be performed on the first asynchronous connection link; and dynamically allocating a first air interface resource to the first asynchronous connection link based on the indication information.

2. The method of claim 1, wherein the indication information comprises at least one of first indication information or second indication information, wherein the first indication information indicates whether the master control device needs to send control signaling to the first slave device through the first asynchronous connection link, wherein the second indication information indicates whether the first slave device needs to send control signaling to the master control device through the first asynchronous connection link, and wherein dynamically allocating the first air interface resource comprises:

allocating, when at least one of the first indication information or the second indication information indicates that the control signaling transmission needs to be performed on the first asynchronous connection link, the first air interface resource to the first asynchronous connection link; or allocating, when both the first indication information and the second indication information indicate that the control signaling transmission does not need to be performed on the first asynchronous connection link, a second air interface resource to a link other than the first asynchronous connection link, wherein the second air interface resource is preconfigured in a periodicity in which the indication information is located, and wherein the second air interface resource is for the master control device to receive or send the control signaling.

3. The method of claim 2, wherein the first indication information comprises third indication information indicating that the master control device needs to send the control signaling to the first slave device through the first asynchronous connection link, and wherein the method further comprises:

generating the control signaling in response to a control operation of a user, wherein the control signaling controls data transmission on the first synchronous connection link;

generating a first data packet comprising the third indication information; and sending the first data packet to the first slave device through the first synchronous connection link.

4. The method of claim 2, further comprising receiving, from the first slave device through the first synchronous connection link, a second data packet comprising the second indication information, wherein the second indication information indicates whether the first slave device needs to send the control signaling to the master control device through the first asynchronous connection link.

5. The method of claim 1, wherein dynamically allocating the first air interface resource comprises allocating the first air interface resource to the first asynchronous connection link in a next periodicity after a periodicity in which the indication information is located.

6. The method of claim 1, wherein the first air interface resource is a part or all of a second air interface resource that is preconfigured in a periodicity in which the indication information is located, and wherein the second air interface resource is for the master control device to receive or send the control signaling.

7. The method of claim 6, wherein dynamically allocating the first air interface resource comprises allocating the first air interface resource to the first asynchronous connection link based on a priority of the first slave device and priorities of one or more second slave devices for transmitting a fourth data packet, and wherein the fourth data packet comprises fourth indication information indicating that the control signaling needs to be transmitted on a second asynchronous connection link between the master control device and the one or more second slave devices.

8. The method of claim 1, further comprising maintaining the first asynchronous connection link when the first synchronous connection link communicates data in a first time period.

9. A communication device comprising:

a memory configured to store instructions; and one or more processors coupled to the memory and configured to execute the instructions to cause the communication device to:

establish a first asynchronous connection link with a first slave device;

establish a first synchronous connection link with the first slave device based on the first asynchronous connection link;

receive, through the first synchronous connection link, a data packet comprising indication information indicating whether control signaling transmission needs to be performed on the first asynchronous connection link; and dynamically allocate a first air interface resource to the first asynchronous connection link based on the indication information.

10. The communication device of claim 9, wherein the indication information comprises at least one of first indication information or second indication information, wherein the first indication information indicates whether the communication device needs to send control signaling to the first slave device through the first asynchronous connection link, wherein the second indication information indicates whether the first slave device needs to send control signaling to the communication device through the first asynchronous connection link and wherein the processor is further configured to execute the instructions to cause the communication device to dynamically allocate the first air interface by:

allocating, when at least one of the first indication information or the second indication information indicates that the control signaling transmission needs to be performed on the first asynchronous connection link, the first air interface resource to the first asynchronous connection link; or allocating, when both the first indication information and the second indication information indicate that the control signaling transmission does not need to be performed on the first asynchronous connection link, a second air interface resource to a link other than the first asynchronous connection link, wherein the second air interface resource is preconfigured in a periodicity in which the indication information is located, and wherein the second air interface resource is for the communication device to receive or send the control signaling.

11. The communication device of claim 10, wherein the first indication information comprises third indication information indicating that the communication device needs to send the control signaling to the first slave device through the first asynchronous connection link, and wherein the processor is further configured to execute the instructions to cause the communication device to:

generate the control signaling in response to a control operation of a user, wherein the control signaling controls data transmission on the first synchronous connection link;

generate a first data packet comprising the third indication information; and send the first data packet to the first slave device through the first synchronous connection link.

12. The communication device of claim 10, wherein the processor is further configured to execute the instructions to cause the communication device to receive, from the first slave device through the first synchronous connection link, a second data packet comprising the second indication information, wherein the second indication information indicates whether the first slave device needs to send the control signaling to the communication device through the first asynchronous connection link.

13. The communication device of claim 9, wherein the processor is further configured to execute the instructions to cause the communication device to dynamically allocate the first air interface resource by allocating the first air interface resource to the first asynchronous connection link in a next periodicity after a periodicity in which the indication information is located.

14. The communication device of claim 9, wherein the first air interface resource is a part or all of a second air interface resource that is preconfigured in a periodicity in which the indication information is located, and wherein the second air interface resource is for the communication device to receive or send the control signaling.

15. The communication device of claim 9, wherein the processor is further configured to execute the instructions to cause the communication device to dynamically allocate the first air interface resource by allocating the first air interface resource to the first asynchronous connection link based on a priority of the first slave device and priorities of one or more second slave devices for transmitting a fourth data packet, and wherein the fourth data packet comprises fourth indication information indicating that the control signaling needs to be transmitted on a second asynchronous connection link between the communication device and the one or more second slave device.

16. The communication device of claim 9, wherein the processor is further configured to execute the instructions to cause the communication device to maintain the first asynchronous connection link when the first synchronous connection link communicates data in a first time period.

17. The communication device of claim 9, wherein the communication device is one of a Bluetooth chip or a master control device.

* * * * *